United States Patent [19]

Nowogrodzki

[11] 4,148,027
[45] Apr. 3, 1979

[54] SURFACE ROUGHNESS MEASURING APPARATUS
[75] Inventor: Markus Nowogrodzki, Sussex, N.J.
[73] Assignee: RCA Corporation, New York, N.Y.
[21] Appl. No.: 890,802
[22] Filed: Mar. 27, 1978
[51] Int. Cl.² .................................................. G01S 9/02
[52] U.S. Cl. .................................. 343/5 SA; 73/105; 73/146; 343/8
[58] Field of Search ............... 73/105, 146; 343/5 SA, 343/8

[56] References Cited
U.S. PATENT DOCUMENTS

| 3,433,058 | 3/1969 | Tobin, Jr. et al. ............... 73/105 X |
| 3,670,328 | 6/1972 | Mardon et al. ........................... 343/8 |
| 3,733,603 | 5/1973 | Johnston ........................... 343/5 SA |
| 4,091,385 | 5/1978 | Petlevich et al. ....................... 343/8 |

Primary Examiner—T. H. Tubbesing
Attorney, Agent, or Firm—H. Christoffersen; Joseph D. Lazar; Raymond E. Smiley

[57] ABSTRACT

A doppler radar of the type normally used to measure relative speed between a transmitter and a reflector is mounted so that its antenna is directed toward the surface to be measured. The radar is coupled to a means for de-emphasizing the doppler shift frequencies of the return signal associated with the speed of the vehicle and emphasizing the lower frequency components of the back scattered signal. The energy contained in these components provides an indication of the roughness of the surface which is in relative motion to the radar.

4 Claims, 2 Drawing Figures

SURFACE ROUGHNESS MEASURING APPARATUS

BACKGROUND OF THE INVENTION

Apparatus exists for measuring the roughness of surfaces such as roads and highways, by means of propelling a suitable vehicle over the surface. The vehicle carries equipment which physically contacts the surface to determine roughness which is then displayed in a suitable manner. One such device is described in U.S. Pat. No. 3,459,038 issued Aug. 5, 1969, to G. Swift. Another device is described in U.S. Pat. No. 3,888,116, issued June 10, 1975 to J. R. Nims.

Mechanical road-contacting devices have the disadvantage of being very sensitive to the suspension of the vehicle under which they are mounted: the vertical component of motion frequently greatly impairs the accuracy of the surface-roughness measurement. For some surfaces, e.g. water, contacting probes are not practical. Thus, a remotely-operated system (one in which no physical contact is made to the surface) is of advantage.

Doppler radars for measuring vehicle speed are known. The radar transmitter-receiver antenna is usually mounted at an angle to the surface over which the vehicle travels. Reflected signals from the surface are mixed with the transmitted signals to produce the difference frequency, which is indicative of speed as is known to those skilled in the art. The radar receiver also detects frequencies not of interest in detecting speed, which are unavoidable and undesirable and usually filtered out in the speed measuring apparatus. One such speed measuring device is described by H. C. Johnson in "Speed Sensors for Locomotives," RCA Engineer, August-September 1976, pp. 34–37.

SUMMARY OF THE INVENTION

In accordance with the invention, a doppler type speed radar system includes a radar antenna which is directed toward the surface such that signals emitted therefrom are reflected back thereto. The frequency spectrum so produced is processed by a means to emphasize the frequencies below some preselected value associated with the speed of the radar system relative to the surface. Means responsive to the emphasized frequencies of the reflected signal produces an indication of the energy contained therein which is representative of the roughness of said surface.

DETAILED DESCRIPTION OF THE PREFERRED EMBODIMENT

Figure 1:
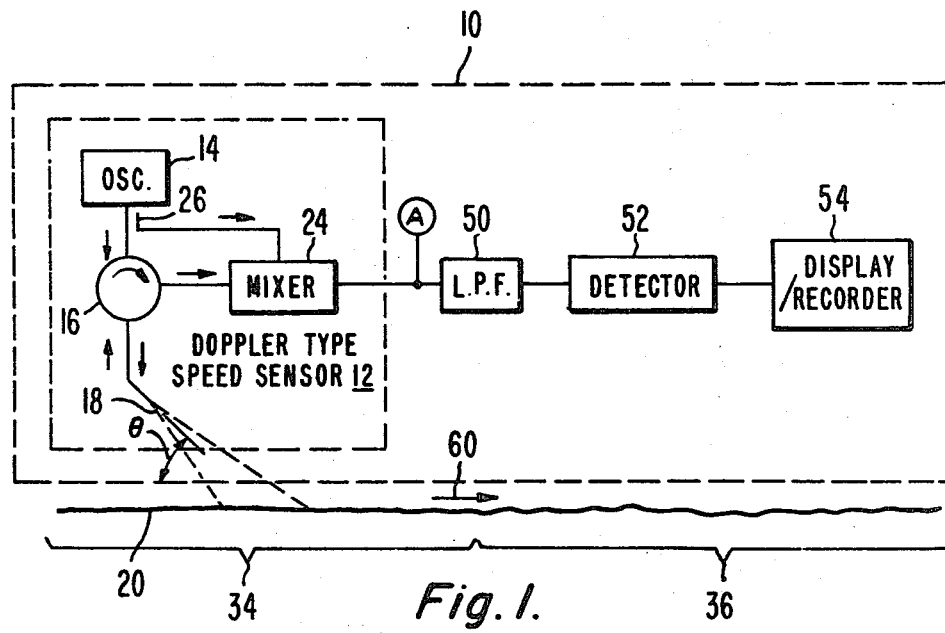
FIG. 1 is a surface roughness measuring apparatus in accordance with the invention.

In FIG. 1 surface roughness measuring apparatus 10 for measuring the roughness of a surface 20 includes a conventional doppler type speed sensor 12. Speed sensor 12 comprises an oscillator 14 for producing suitable radio frequency (RF) signals, a three-port circulator 16 coupled to oscillator 14 to receive signals therefrom, an antenna means 18 coupled to circulator 16, a mixer 24 also coupled to circulator 16 and to a directional coupler 26 for deriving difference frequencies between the signal produced by oscillator 14 as radiated by antenna means 18 and the signals reflected to antenna means 18 from the surface 20. All the elements within block 12 as well as their interconnections are well known to those skilled in the art.

Figure 2:
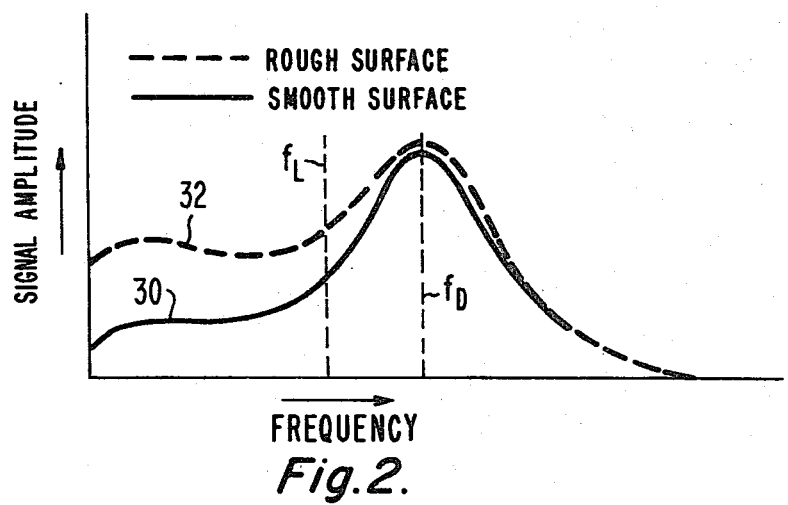
FIG. 2 is a set of idealized doppler frequency distribution curves useful in understanding the operation of the system of FIG. 1.

As surface measuring apparatus 10 moves relative to surface 20 by means not shown (either apparatus 10 may be moved such as by a vehicle or surface 20 may move such as, for example, a flowing liquid), a signal will appear at terminal A which, as displayed in conventional manner is similar to doppler frequency distribution curves 30 or 32, FIG. 2. These distribution curves are idealized in that they represent respectively envelopes of frequency components produced by radar sensor 12. Curve 30, FIG. 2, is associated with passage of apparatus 10 along a relatively smooth portion 34 (FIG. 1) of surface 20. Curve 32 is associated with passage of apparatus 10 relative to a relatively rough portion 36 of surface 20. Surface 20 may be the surface of a road, of land, of some liquid such as water in a flowing stream or ocean or other body of water, or of other surfaces such as, for example, movement of material on a conveyor belt.

It will be noted that curves 30 and 32 have peak amplitudes at the same frequency, $f_D$, the doppler frequency representing the same relative speed of apparatus 10 along surface 20. In FIG. 2, a frequency $f_L$ has been arbitrarily indicated, marking the value at which the amplitudes of curves 30 and 32 are markedly different.

As is known to those skilled in the art, the doppler frequency ($f_D$) may be represented by:

$$f_D = 2V \cos \theta / \lambda \qquad (1)$$

where:

V = velocity of relative motion between elements 10 and 20;

$\theta$ = angle of incidence of the signal transmitted from antenna 18 to the surface 20;

$\lambda$ = the wavelength of a signal transmitted from antenna 18.

That is, for a given angle, $f_D = kv$ where K is a constant. A value for $\theta$ of 45° is typically used.

In an ideal system in which antenna 18 produces a pencil beam, for a given speed, the curve of FIG. 2 would comprise a single vertical line of frequency $f_D$ representative of that speed since the beam will cause a doppler signal at only one frequency. As speed is increased, so is the frequency of $f_D$; as speed is decreased so is the frequency of $f_D$.

In an actual system, antenna 18, as is well known to those skilled in the art, produces a cone shaped beam, parts of which therefore strike different portions of surface 20 at different angles $\theta$. The signal reflected back to antenna 18 from surface 20 contains a spectrum of frequencies near frequency $f_D$ (FIG. 2). In a conventional speed measuring system, apparatus is provided for detecting the value of the frequency $f_D$. Other frequencies in the spectrum are undesirable and are ignored or suppressed. The amplitudes of the frequency components, including those other than the doppler frequency $f_D$, depend on the amount of back scatter which is dependent on the roughness of the surface and are therefore a measure of the roughness of the surface. The energy of the reflected signal at frequencies other than $f_D$ thus serves as an indication of road roughness.

In the illustrated embodiment, mixer 24 is coupled to a means for de-emphasizing frequencies near frequency $f_D$, and emphasizing frequencies below frequency $f_L$, such as a low pass filter (LPF) 50 designed to pass only those frequencies in the low-frequency portion of the curves of FIG. 2, e.g., below frequency $f_L$. These frequency components are indicative of the roughness of the surface and, unlike the doppler frequency $f_D$, they are only minimally affected by the relative speed of surface 20. However, for increased measurement accuracy, low pass filter 50 may either be of the type in which the cut-off frequency can be controlled and made dependent on speed or the system constraints can be such that there is required to be a certain minimum speed, so that the frequencies passed by low pass filter 50 are always suitable for roughness measurement.

LPF 50 is coupled to a means such as a detector 52, for producing an output voltage indicative of the energy contained in the frequency spectrum passed by the LPF. Means 52 may be of the type producing an output signal which represents the integral of the area under the frequency-amplitude curve of FIG. 2. Alternatively, it may be of the type producing an output signal which is the average amplitude of the frequency signal it receives. The choice will depend on the particular surface to be measured and on the desired accuracy of measurement. Detector 52 is coupled to a suitable display and/or recorder means 54 for displaying and/or recording a measure of surface roughness. Although not shown, display/recorder 54 may also receive signals indicative of the location of apparatus 10 so that roughness of measurements recorded can be correlated with their position along surface 20.

It should be noted that if an integrating type display is used, the area under the curve including the frequencies near $f_D$ may be integrated so that LPF 50 is not required. It should be further noted that although frequencies $f_D$ and those nearby will be included in the integrated signal the total energy will still be a function of surface roughness.

Operation of the surface measuring apparatus 10 is as follows. Relative motion of apparatus 10 along surface 20 is created by suitable means. For example, apparatus 10 may be mounted on a suitable vehicle, such as an automobile or truck (not shown) which is driven on a road having a surface 20. Alternatively apparatus 10 may be held stationary while surface 20 of, for example, a stream of water moves. In any case oscillator 14 produces an RF signal of a suitable frequency such as 10.5 GHz which signal is passed by circulator 16 to antenna 18 where it is radiated therefrom. The radiated signal strikes surface 20, and in the absence of a perfectly smooth surface, a portion of it is reflected back to antenna 18 and passed by circulator 16 to mixer 24. Simultaneously a small part of the signal produced by oscillator 14 is passed by directional coupler 26 to mixer 24. Mixer 24 combines the two signals received to produce a doppler signal which is the difference between the signal frequency and that of the reflected signal, commonly known as the doppler frequency.

Since apparatus 10, as illustrated, is passing along a relatively smooth surface portion 34 of surface 20, the output signal of mixer 24 at terminal A is represented by curve 30, FIG. 2, that is, a curve that has a peak at $f_D$ representative of the speed of apparatus 10 relative to surface 20 and a relatively low amplitude portion to the left of frequency $f_L$ representing the relative lack of roughness of surface 20, portion 34.

LPF 50 passes only those frequencies below $f_L$ (FIG. 2). By maintaining the speed of motion of apparatus 10 sufficiently high, its associated frequency $f_D$ is substantially above frequency $f_L$ and is therefore not passed by LPF 50. The signal which is passed by LPF 50 is representative of the roughness of surface 20 in the vicinity of antenna 18. Detector 52 processes the signal either to obtain its average, or integrates the signal to obtain the area under the frequency-amplitude curve, FIG. 2, and the resultant signal is displayed and/or recorded on device 54. As device 10 moves along surface 20, in the direction of arrow 60, signals from antenna 10 will ultimately strike surface portion 36 of surface 20, a portion which is rougher than portion 34. When this occurs, mixer 24 produces a signal at terminal A which is the curve 32, FIG. 2, which causes an indication of a relatively rougher surface to be displayed and/or recorded by device 54. Other surface portions of surface 20 will result in the generation of other curves of the same general shape as curves 30 and 32 which are a measure of the roughness of surface 20. It is expected that for particular measurement conditions (e.g., speed of a stream, roughness of a road, nature of solid material on a conveyor belt) some or all of the measurement parameters, i.e., relative speed, antenna angle $\theta$, frequency of transmission, antenna cone angle, cut-off frequency of LPF, etc., could be optimized to obtain a system providing increased measurement accuracy. For example, using the instrument in the previously cited article by H. C. Johnson for speed (not surface) measurements, it was noted that for the particular frequency and antenna angles peculiar to that instrument, the optimum backscatter (in terms of $f_D$) was obtained for an antenna angle of 40° for measurement over asphalt and 30° for measurement over rough terrain, such as freshly-plowed fields. See also "A Doppler Radar Velocity Meter for Agricultural Tractors," by S. S. Stuchly et al., IEEE Transactions on Vehicular Technology, Vol. VT27, No. 1, February, 1978, which describes, in a speed measuring system, the optimization of antenna angle $\theta$ for a number of parameters.

What is claimed is:

1. In a system for measuring roughness of a surface having movement relative to the system which includes a doppler speed sensing radar comprising an antenna means for radiating a radio frequency signal toward said surface and receiving the back scatter signal therefrom and mixing means producing a signal which represents the difference frequency between the frequencies of said radiated and back scattered signals, said difference signal being comprised of a frequency spectrum including the doppler frequency, $f_D$, associated with the relative speed of said system and frequencies below the doppler frequency which are associated with the roughness of said surface comprising in combination:
   means responsive to said difference frequency for producing a signal which is a function of the energy contained in said frequencies below the doppler frequency; and
   means responsive to said energy function signal for at least one of recording and displaying an indication thereof which is an indication of the roughness of said surface.

2. The combination as set forth in claim 1 wherein said means producing said energy signal comprises means responsive to said difference signal for passing only those frequencies below a preselected value, $f_L$, where $f_L$ is less than $f_D$, and means responsive to said passed frequencies for producing a signal representing the energy in said passed frequencies.

3. The combination as set forth in claim 2 wherein said means responsive to said passed frequencies comprises means producing a signal which represents the average of the amplitudes of said passed frequencies, said recording or display means being adapted to receive said average signal.

4. The combination as set forth in claim 2 wherein said means responsive to said passed frequencies comprises means producing a signal which represents the integral of the amplitudes of the passed frequencies, said recording or display means being adapted to receive said integral signal.

* * * * *